US011259254B2

(12) United States Patent
Makki et al.

(10) Patent No.: US 11,259,254 B2
(45) Date of Patent: Feb. 22, 2022

(54) VARIABLE-LENGTH CODING IN A NOMA-BASED COMMUNICATION SYSTEM

(71) Applicant: Telefonaktiebolaget LM Ericsson (publ), Stockholm (SE)

(72) Inventors: Behrooz Makki, Gothenburg (SE); Ali Behravan, Stockholm (SE)

(73) Assignee: TELEFONAKTIEBOLAGET LM ERICSSON (PUBL), Stockholm (SE)

( * ) Notice: Subject to any disclaimer, the term of this patent is extended or adjusted under 35 U.S.C. 154(b) by 632 days.

(21) Appl. No.: 16/099,967

(22) PCT Filed: Aug. 8, 2018

(86) PCT No.: PCT/EP2018/071511
§ 371 (c)(1),
(2) Date: Nov. 8, 2018

(87) PCT Pub. No.: WO2020/030260
PCT Pub. Date: Feb. 13, 2020

(65) Prior Publication Data
US 2021/0227476 A1 Jul. 22, 2021

(51) Int. Cl.
*H04W 4/00* (2018.01)
*H04W 52/34* (2009.01)
*H04L 1/00* (2006.01)

(52) U.S. Cl.
CPC ......... *H04W 52/346* (2013.01); *H04L 1/0002* (2013.01); *H04L 1/0006* (2013.01); *H04L 1/0026* (2013.01)

(58) Field of Classification Search
USPC ......... 370/329, 328, 330, 331, 332; 375/295
See application file for complete search history.

(56) References Cited

U.S. PATENT DOCUMENTS 8,891,462 B2 * 11/2014 Luo .................. H04L 5/0053
370/329
2012/0120882 A1 * 5/2012 Luo .................. H04L 5/0053
370/329

(Continued)

FOREIGN PATENT DOCUMENTS

EP       3 276 846 A1    1/2018
WO   WO-2019025319 A1 *  2/2019    ......... H04L 27/2628

OTHER PUBLICATIONS

3GPP TR 36.866 V12.0.1 (Mar. 2014), 3rd Generation Partnership Project; Technical Specification Group Radio Access Network; Study on Network-Assisted Interference Cancellation and Suppression (NAIC) for LTE; (Release 12); Mar. 2014. (64 pages).

(Continued)

*Primary Examiner* — David Q Nguyen
(74) *Attorney, Agent, or Firm* — Rothwell, Figg, Ernst & Manbeck, P.C.

(57) ABSTRACT

A variable-length coding method to improve the performance of downlink NOMA. Depending on the channel conditions and the amount of data waiting to be transmitted the UEs served by the NN, the NN groups UEs (e.g., pairs two UEs) with appropriate channel qualities and adapts the transmission powers in different sub-codewords as well as the codeword length such that the UEs minimum quality-of-service requirements are satisfied. This makes it possible to improve the UEs/network achievable rates and the NN energy efficiency.

19 Claims, 11 Drawing Sheets

(56) References Cited

U.S. PATENT DOCUMENTS

| | | | |
|---|---|---|---|
| 2013/0272443 A1* | 10/2013 | Subramanian | H04L 1/0068 |
| | | | 375/295 |
| 2016/0191175 A1* | 6/2016 | Hwang | H04B 15/00 |
| | | | 370/329 |
| 2016/0353486 A1* | 12/2016 | Xia | H04W 72/044 |
| 2017/0099090 A1* | 4/2017 | Liu | H04B 7/0626 |
| 2017/0134109 A1 | 5/2017 | Hwang et al. | |
| 2017/0215201 A1* | 7/2017 | Kim | H04L 1/1812 |
| 2017/0338918 A1* | 11/2017 | Tang | H04L 5/00 |
| 2018/0351708 A1* | 12/2018 | Wang | H04B 7/0452 |
| 2019/0289623 A1* | 9/2019 | Kim | H04L 1/1893 |

OTHER PUBLICATIONS

3GPP TR 36.859 V13.0.0 (Dec. 2015), 3rd Generation Partnership Project; Technical Specification Group Radio Access Network; Study on Downlink Multiuser Superposition Transmission (MUST) for LTE; (Release 13); Dec. 2015. (48 pages).

3GPP TSG RAN WG1 Meeting #86, R1-166056, Göteborg, Sweden, Aug. 22-26, 2016; MCC Support, Final Report of 3GPP TSG RAN WG1 #85 v1.0.0 (Nanjing, China, May 23-27, 2016). (170 pages).

Xu, Peng et al., "NOMA: An Information Theoretic Perspective", arXiv:1504.07751v2 [cs.IT] May 12, 2015. (6 pages).

International Search Report dated Apr. 15, 2019 issued in International Application No. PCT/EP2018/071511. (4 pages).

Qian L.P. et al., "Optimal Power and Rate Allocation in Buffer-Aided NOMA Relay Networks", IEEE/CIC International Conference on Communications in China (ICCC), 2017. (5 pages).

\* cited by examiner

VARIABLE-LENGTH CODING IN A NOMA-BASED COMMUNICATION SYSTEM

CROSS REFERENCE TO RELATED APPLICATION(S)

This application is a 35 U.S.C. § 371 National Stage of International Patent Application No. PCT/EP2018/071511, filed Aug. 8, 2018, designating the United States.

TECHNICAL FIELD

Disclosed are embodiments related to a non-orthogonal multiple access (NOMA) communication system.

BACKGROUND

The design of multiple access schemes is of interest in the design of cellular telecommunication systems. The goal of multiple access schemes is to provide multiple user equipments (UEs) (i.e., wireless communication devices, such as, for example, smartphones, tablets, phablets, smart sensors, wireless Internet-of-Things (IoT) devices, etc., that are capable of wirelessly communicating with a base station or other access point) with radio resources in a spectrum, cost, and complexity-efficient manner. In 1G-3G wireless communication systems, frequency division multiple access (FDMA), time division multiple access (TDMA) and frequency division multiple access (CDMA) schemes have been introduced. Long-Term Evolution (LTE) and LTE-Advanced employ orthogonal frequency division multiple access (OFDMA) and single-carrier (SC)-FDMA as orthogonal multiple access (OMA) schemes. Such orthogonal designs have the benefit that there is no mutual interference among UEs, leading to high system performance with simple receivers.

Recently, non-orthogonal multiple access (NOMA) has received considerable attention as a promising multiple access technique for LTE and 5G systems. With NOMA, two or more UEs may share the same time resource and frequency resource as well as, if applicable, the same code resource and beam resource. Particularly, 3GPP has considered NOMA in different applications. For instance, NOMA has been introduced as an extension of the network-assisted interference cancellation and suppression (NAICS) for inter-cell interference (ICI) mitigation in LTE Release 12 as well as a study item of LTE Release 13, under the name of "Downlink multiuser superposition transmission." Also, in recent 3GPP meetings, it is decided that new radio (NR) should target to support (at least) uplink NOMA, in addition to the OMA approach.

SUMMARY

There are situations where using NOMA not only outperforms OMA in terms of sum rate, but also is more optimal in achieving the maximum capacity region. NOMA-based data transmission, however, may face the following issues:

First, the performance gain of the NOMA, compared to OMA, and its usefulness depend a lot on the channel quality of the grouped UEs. Particularly, depending on the channel qualities, the network may not be able to satisfy a UE's minimum quality-of-service requirement or the relative performance gain of NOMA may be not so significant that it worth the additional decoding complexity/delay.

Second, due to the implementation complexity and the decoding delay of NOMA, in many cases it is more beneficial to implement NOMA in dense networks with a large number of UEs requesting access such that there is not enough orthogonal resources to serve all of the UEs in an OMA-fashion. In such a scenario, channel state information (CSI) acquisition becomes a bottleneck of the system performance as it may consume a large portion of the available spectrum. For this reason, NOMA is expected to be most useful in stationary systems working at fixed frequencies, where the channel coefficients remain (almost) constant over multiple packet transmissions and CSI update is rarely required. However, with stationary UEs, the network suffers from poor network diversity which affects the performance of hybrid automatic repeat request (HARQ) schemes and increases the probability of requiring multiple retransmissions.

Third, the performance gain of NOMA may be at the cost of low achievable rates for "weak" UEs (i.e., UEs having a poor channel condition with the access point, such as, for example, a UE located at or near a cell-edge), particularly if the direct link between the weak UE and the network node (NN) experiences poor channel condition. This is especially because the relative performance gain of NOMA, compared to OMA, increases as the difference between the channel quality of the paired UEs increases. In such cases, the NN may experience a poor error probability for the data transmission of the weak UE.

This disclosure describes, among other improvements, a variable-length coding method to improve the performance of downlink NOMA. Depending on the channel conditions and the amount of data waiting to be transmitted the UEs served by the NN, the NN groups UEs (e.g., pairs two UEs) with appropriate channel qualities and adapts the transmission powers in different sub-codewords as well as the codeword length (i.e., number of sub-codewords used) such that the UEs minimum quality-of-service requirements are satisfied. This makes it possible to improve the UEs/network achievable rates and the NN energy efficiency. This also makes it possible to for the UEs to decode their own messages with no (or, with fewer number of) retransmissions. As a result, the end-to-end packet transmission delay for each UE decreases. Moreover, variable-length coding increases the achievable rate for the weak UEs and reduces the decoding complexity for the strong UEs.

Accordingly, in one aspect there is provided a method for transmitting messages, where the method is performed by a network node (NN). The method includes the NN obtaining first channel gain information indicating the gain of a first channel between the NN and a first UE and second channel gain information indicating the gain of a second channel between the NN and a second UE. The NN also obtains (e.g., determines) first buffer size information for the first UE and second buffer size information for the second UE. The NN uses the obtained channel gain information and buffer size information to determine a first number of sub-codewords, $n1$, for use in transmitting a first message for the first UE and a second number of sub-codewords, $n2$, for use in transmitting a second message for the second UE. The NN then transmits a superimposed signal comprising the first message for the first UE and the second message for the second UE, wherein: the number of sub-codewords used to transmit the first message is equal $n1$, the number of sub-codewords used to transmit the second message is equal $n2$. In some scenarios, $n1 > n2$, in other scenarios $n1 = n2$ or $n2 > n1$.

In another aspect there is provided a NN for transmitting messages. The NN is adapted to obtain: i) first channel gain information indicating the gain of a first channel between the NN and a first UE and ii) second channel gain information indicating the gain of a second channel between the NN and a second UE. The NN is further adapted to obtain: i) first buffer size information for the first UE and ii) second buffer size information for the second UE. The NN is further adapted to use the obtained channel gain information and buffer size information to determine a first number of sub-codewords, $n_1$, for use in transmitting a first message for the first UE and a second number of sub-codewords, $n_2$, for use in transmitting a second message for the second UE. The NN is further adapted to transmit a superimposed signal comprising the first message for the first UE and the second message for the second UE, wherein the number of sub-codewords used to transmit the first message is equal $n_1$, and the number of sub-codewords used to transmit the second message is equal $n_2$.

In some embodiment the NN comprises a channel gain information obtaining unit for obtaining: i) first channel gain information indicating the gain of a first channel between the NN and a first UE and ii) second channel gain information indicating the gain of a second channel between the NN and a second UE. The NN further comprises a buffer size information obtaining unit for obtaining: i) first buffer size information for the first UE and ii) second buffer size information for the second UE. The NN further comprises a determining unit for using the obtained channel gain information and buffer size information to determine: i) a first number of sub-codewords, $n_1$, for use in transmitting a first message for the first UE and ii) a second number of sub-codewords, $n_2$, for use in transmitting a second message for the second UE. The NN further comprises a transmitting unit for employing a transmitter to transmit a superimposed signal comprising the first message for the first UE and the second message for the second UE, wherein the number of sub-codewords used to transmit the first message is equal $n_1$ and the number of sub-codewords used to transmit the second message is equal $n_2$.

Compared to the cases with conventional NOMA techniques, the embodiments described herein improve the UEs and the network throughput or, equivalently, the NN energy efficiency. Also, the implementation of adaptive power allocation in paired sub-codewords as well as variable-length coding create virtual diversity and reduce the probability of requiring multiple retransmissions. Consequently, the expected end-to-end packet transmission delay for each UE is reduced. Also, the embodiments reduce the decoding complexity of the strong UE and increase the achievable rate of the weak UE, leading to better fairness between the UEs.

BRIEF DESCRIPTION OF THE DRAWINGS

The accompanying drawings, which are incorporated herein and form part of the specification, illustrate various embodiments.

DETAILED DESCRIPTION

Figure 1:
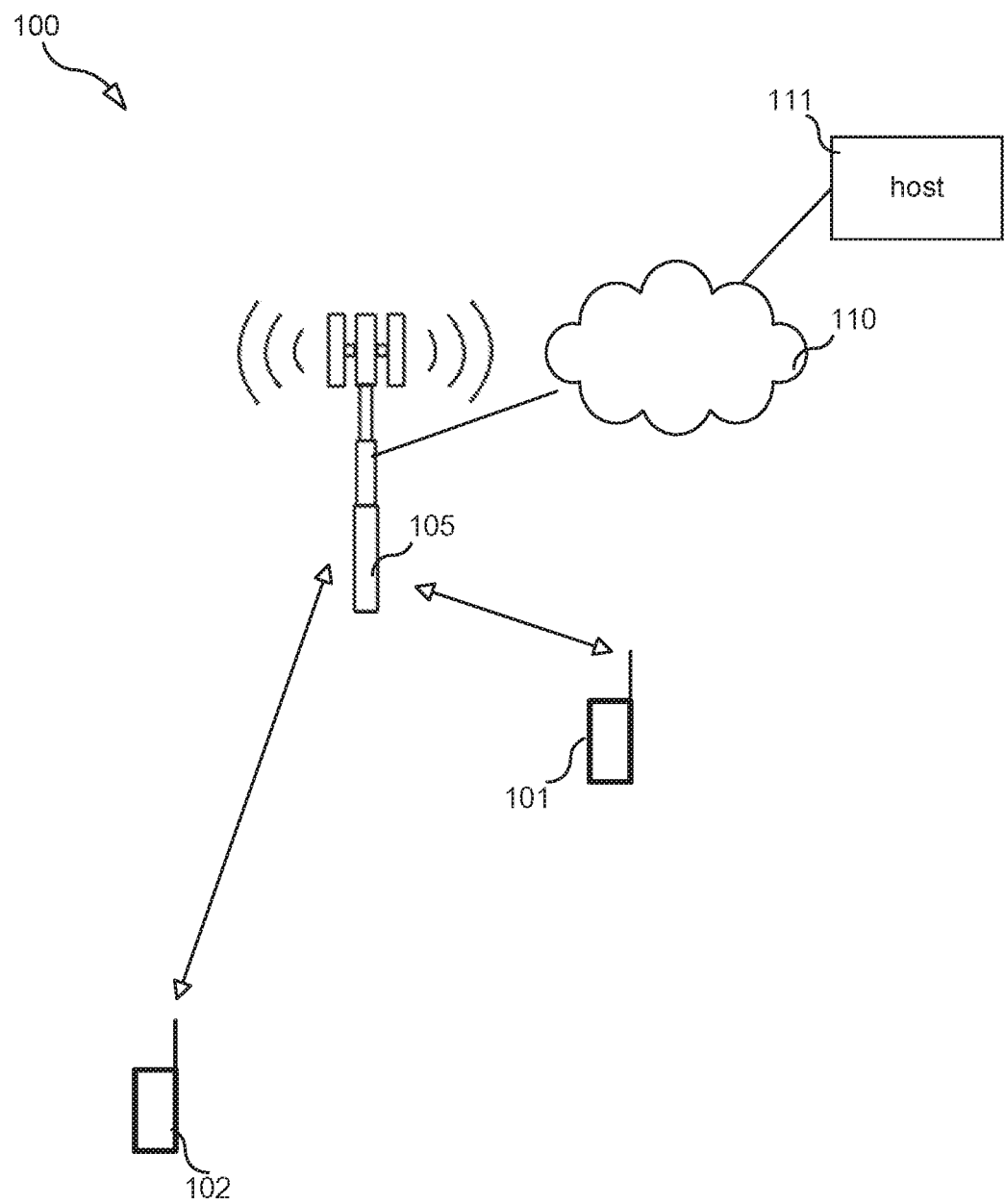
FIG. 1 illustrates a network node communicating simultaneously with a first UE and a second UE.

FIG. 1 illustrates a network 100 having a network node (NN) 105 (e.g., a system comprising a 4G or 5G base station or other access point) serving two UEs: UE 101 (also referred to herein as $UE_1$) and UE 102 (also referred to herein as $UE_2$). The two UEs have different channel (or "link") qualities. In this scenario, UE 102 is a "weak" UE (e.g., a cell-edge UE) and UE 101 is a "strong" UE (i.e., a UE experiencing a good channel condition with NN, such as, for example, a UE located at or near a cell center).

With respect to uplink OMA transmissions, the UE 101's and UE 102's signals are transmitted in orthogonal resources, for instance at the same time but in different frequency bands, and NN 105 decodes the two transmitted signals separately. With respect to downlink OMA transmissions, NN 105 transmits for UE 101 a first signal using for example a first frequency band and transmits for UE 102 a second signal using for example a second frequency band that does not overlap with the first frequency band.

With respect to uplink NOMA, on the other hand, the UEs share the same frequency (or "spectrum") and time resources as well as code or spreading resources, if any, to send their messages simultaneously. That is, NN 105 receives a combined signal containing the message transmitted by UE 101 and the message transmitted by UE 102. In such a NOMA scenario, NN 105, using for example a successive interference cancellation (SIC) decoder, first decodes the message of UE 101 (the "strong" UE), considering the message of UE 102 as noise. Then, after successfully decoding UE 101's message, NN 105 subtracts UE 101's message from the received signal and decodes UE 102's signal with no interference from UE 101.

With respect to downlink NOMA, NN 105 serves UE 101 and UE 102 in common spectrum resource blocks (i.e., common time-frequency resources as well as code or spreading resources, if any). Assume that that $UE_1$ (i.e., UE 101) experiences a better channel quality, compared to $UE_2$ (i.e., UE 102). That is, we have $|h_1| \geq |h_2|$ where $h_i$, i=1, 2, represents the channel coefficient of the NN-$UE_i$ link. Finally, we define the channel gains as $g_i = |h_i|^2$, i=1, 2. In the downlink, using NOMA in time slot t the NN generates and transmits a superimposed signal $S(t) = \sqrt{P_1}X_1(t) + \sqrt{P_2}X_2(t)$ to both UEs in the same resources. Here, $X_1(t)$ and $X_2(t)$ are the unit-variance message signals of $UE_1$ and $UE_2$, respectively, and $P_i$, i=1, 2, are their corresponding transmit powers with $P_1+P_2=P$ where P is the NN total power. In this way, the signal received by $UE_i$, i=1, 2, is given by $$Y_i(t) = h_i(\sqrt{P_1}X_1(t) + \sqrt{P_2}X_2(t)) + Z_i(t), i=1,2, \tag{1}$$

where $Z_i(t)$ denotes the Gaussian white noise added in $UE_i$, i=1, 2.

The goal of each UE is to decode its own message, although a UE may first decode the message of the other UE to reduce the interference. Particularly, $UE_2$ considers the signal of $UE_1$ as an interference and uses typical OMA-based receivers to decode its own message. This is because it can be theoretically shown that there is no chance that $UE_2$ can first decode-and-remove the message of $UE_1$ (and then, decode its own message interference-free).

$UE_1$, on the other hand, uses a SIC decoder to first decode-and-remove the message for $UE_2$ (i.e., $X_2(t)$) and then decode the message for itself (i.e., $X_1(t)$) interference-free. More specifically, UE1 first uses the combined signal (i.e., $Y_1(t)$) to decode the message for UE 102 (i.e., $X_2(t)$) and then using the decoded message constructs a signal (e.g., constructs $h_1\sqrt{P_2}X_2(t)$) the and then removes (i.e., cancels) the constructed signal from the combined signal so that $X_1(t)$ can then be decoded from the residual (e.g., $X_1(t)$ can be decoded from $h_1\sqrt{P_1}X_1(t)+Z_1(t)$).

With these assumptions, the achievable rates of the UEs are given by:

$$\begin{cases} R_1 = \log_2(1 + P_1 g_1), \\ R_2 = \log_2\left(1 + \frac{P_2 g_2}{1 + P_1 g_2}\right), \\ P_1 + P_2 = P. \end{cases} \quad (2)$$

Considering these assumptions, the following three points may be noted.

First, the performance gain of the NOMA, compared to OMA, and its usefulness depend on the channel quality of the UEs that are grouped together. Particularly, depending on the channels quality, some UE groupings may not satisfy each UE's minimum quality-of-service requirement or the relative performance gain of NOMA, compared to OMA, may be not worth the additional decoding complexity/delay.

Second, due to the interference signal of $UE_1$, $UE_2$ experiences a low channel quality and may need multiple retransmissions to decode its message. This is particularly because 1) it has been previously shown that the highest relative performance gain of NOMA, compared to OMA, is observed when two UEs with good and poor channel qualities are paired and 2) due to the CSI overhead, NOMA is of much interest in stationary/slow-moving systems, where the channel coefficients remain (almost) constant over multiple packet transmissions and CSI update is rarely required. However, such systems suffer from poor network diversity which increases the probability of requiring multiple retransmissions.

And third, because of the implementation complexity and the decoding delay of NOMA, it is of most interest in dense networks with a large number of UEs requesting access such that there are not enough orthogonal resources to serve them in an OMA-fashion. In such scenarios, it is essential to design efficient UE grouping methods such that not only the UEs minimum rate constraints are satisfied, but also NOMA-based data transmission leads to considerable performance improvement, compared to OMA.

Accordingly, it would be useful to design efficient methods which 1) reduce the probability of requiring multiple retransmissions, 2) increase the achievable rates of the UEs, particularly the weak UE, 3) reduce the decoding complexity for strong UEs, and 4) improve the NN energy efficiency/fairness between the UEs.

Hence, disclosed herein is a joint UE pairing, power allocation and variable-length coding method for downlink NOMA.

Let N denote the total number of grouped UEs and the channel gain in the NN-$UE_i$ link by $g_i$, i=1, ..., N. Also, let $q_i$, i=1, ..., N we represent the NN buffer size for $UE_i$, e.g., the number of bits that NN has to send to the i-th UE.

In one embodiment, NN 105 first uses typical channel estimation methods to estimate the channel gains $g_i$, i=1, ..., N. Then, considering two specific UEs i and j, the NN, as described below, uses the information of $g_i$ and $g_j$ as well as the buffer sizes $q_i$, $q_j$ to determine the minimum number of sub-codewords and their corresponding power allocation.

More specifically, for example, let $n_i$, i=1, ..., N be the number of sub-codewords considered for $UE_i$ and $P_i(k)$, i=1, ..., N, k=1, ..., $n_i$, be the power allocated to the k-th sub-codeword of the i-th UE. Also, with no loss of generality assume $g_i \geq g_j$ such that the UE, can perform SIC-based decoding. In this way, the maximum number of information bits that can be sent to UEs i and j is given by $$\begin{cases} Q_i = L\sum_{k=1}^{n_i} \log_2(1 + g_i P_i(k)), & (i) \\ Q_j = L\sum_{k=1}^{n_i} \log_2\left(1 + \frac{g_j P_j(k)}{1 + g_j P_i(k)}\right) + L(n_j - n_i)\log_2(1 + g_j P), & (ii) \\ P_i(k) + P_j(k) = P, \forall k = 1, \ldots, n_i, & (iii) \end{cases} \quad (3)$$

if $n_j > n_i$, otherwise $$\begin{cases} Q_i = L\sum_{k=1}^{n_i} \log_2(1 + g_i P_i(k)), & (i) \\ Q_j = L\sum_{k=1}^{n_j} \log_2\left(1 + \frac{g_j P_j(k)}{1 + g_j P_i(k)}\right), & (ii) \\ P_i(k) + P_j(k) = P, \forall k = 1, \ldots, n_i. & (iii) \end{cases} \quad (4)$$

Here, L is the length of sub-codewords. Also, the achievable rates (3) and (4) come from the maximum achievable rates of parallel Gaussian channels and are based on the fact that $UE_i$ decodes-and-removes the interference from the signal of $UE_j$. On the other hand, the UE with the worse channel quality, i.e., $UE_j$, only experiences an interference-free channel in sub-codewords k=$n_i$+1, ..., $n_j$ if $n_j > n_i$. Finally, (3.iii) and (4.iii) follow from the NN sum power constraint.

Using (3)-(4) and considering both cases with $n_j > n_i$ and $n_j \leq n_i$, the NN solves $$\{\tilde{n}_i, \tilde{n}_j, \tilde{P}_i(k), \tilde{P}_j(k), k=1, \ldots, \tilde{n}_j\} = \arg_{P_i(k), P_j(k), n_j, n_i} \{Q_i \geq q_i \& Q_j \geq q_j\} \quad (5)$$

to find the minimum required number of sub-codewords $\tilde{n}_i$, $\tilde{n}_j$ as well as their corresponding power allocation $\tilde{P}_i(k)$, $\tilde{P}_j(k)$ such that the UEs buffer size constraints are satisfied.

If (5) has a feasible solution, the NN 105 informs the UEs i and j (e.g., UE 101 and UE 102) of the number of allocated sub-codewords. NN 105 may also inform the UEs about the channel gain, their appropriate message decoding scheme. Otherwise, if (5) does not have a feasible solution, the NN tries pairing two different UEs with the same procedure.

The UEs, after receiving the information from NN, adapt their decoding schemes and decode the messages based on all signals accumulated in different sub-codeword transmissions which are associated with their own signal.

Also, because the UEs decode messages with different lengths, leading to different decoding delays at the UEs, a UE may add an appropriate sleep mode delay such that data transmissions are synchronized.

Considering the above method, the following four points are noted.

First, the implementation of variable-length coding gives the weak UE the chance to receive part of its signal interference-free. This point, along with adaptive power allocation, improves the achievable rate of the weak UE, leading to better fairness in the network. The strong UE will also benefit from variable-length coding and adaptive power allocation leading to higher network sum rate or, equivalently, better NN energy efficiency for given data rates.

Second, variable-length coding reduces decoding complexity, as the UE with the less number of sub-codewords only decodes part of the received signals that corresponds to its own message.

Third, adaptive power allocation between the sub-codewords creates virtual diversity and reduces the probability of requiring multiple retransmissions. Thus, the expected end-to-end packet transmission delay for each UE is reduced.

Fourth, we presented the setup for the cases where two UEs are paired if their required number of transmission bits can be supported. However, the discussions can be extended to the cases with different performance metrics as well. For instance, finding the maximum achievable number of information bits for each UE in the OMA-based data transmission fashion, one can pair two UEs if $$\frac{(Q_{i,NOMA} + Q_{j,NOMA}) - (Q_{i,OMA} + Q_{j,OMA})}{Q_{i,NOMA} + Q_{j,NOMA}} \geq \theta, \quad (6)$$

i.e., when the relative performance improvement of NOMA, compared to OMA, exceeds a threshold θ, considered by the network designer, such that NOMA-based data transmission worth the additional decoding delay/complexity. In (6), $Q_{i,NOMA}$ and $Q_{i,OMA}$ denote the maximum number of bits that can be supported for $UE_i$ in the cases with NOMA- and OMA-based data transmission, respectively.

Figure 2:
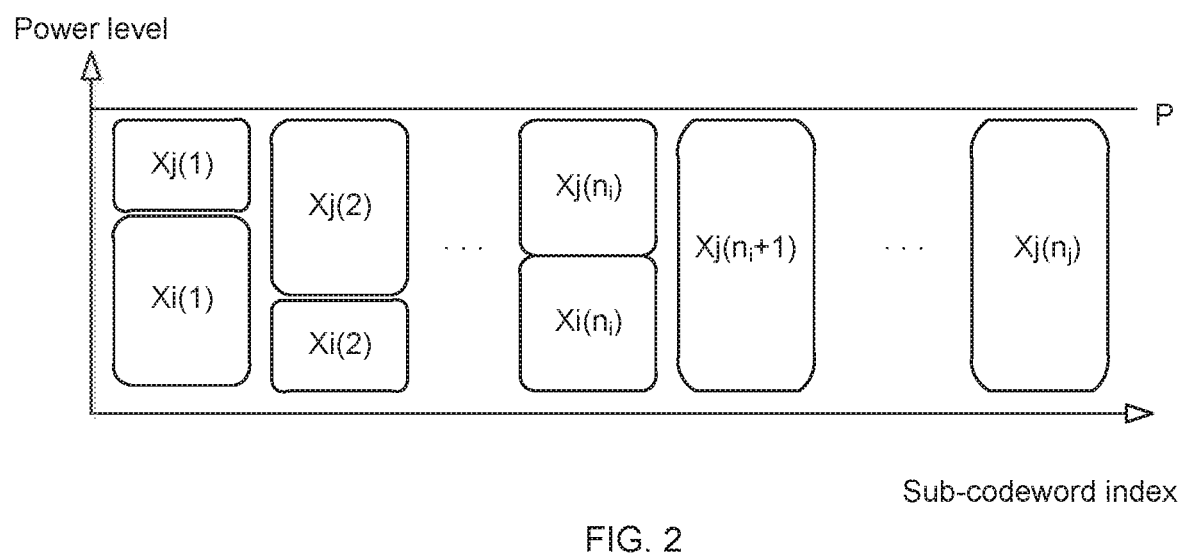
FIG. 2. illustrates a NOMA-based transmission for a pair of UEs.

FIG. 2. illustrates a NOMA-based transmission for a pair of UEs ($UE_i$ and $UE_j$) according to an embodiment. As shown in FIG. 2, the NN 105 transmits the message for $UE_i$ using $n_i$ sub-codewords and transmits the message for $UE_3$ using $n_3$ sub-codewords. Additionally, as shown in FIG. 2, different power levels may be used to transmit different corresponding sub-codewords. For example, as illustrated in FIG. 2 the power level used to transmit sub-codeword $X_j(2)$ is greater than the power level used to transmit the sub-codeword $X_i(2)$.

Figure 3:
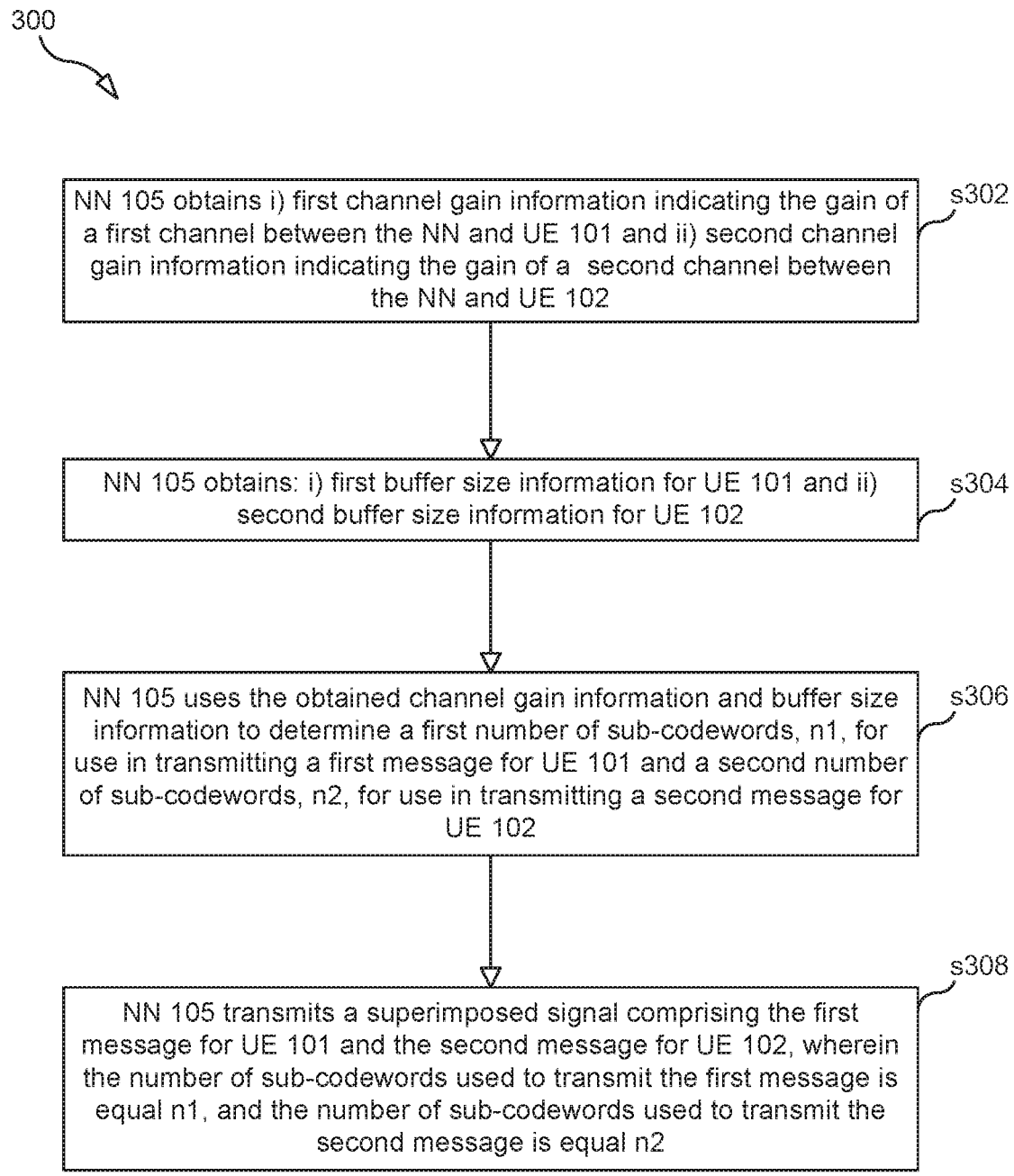
FIG. 3 is a flow chart illustrating a process according to one embodiment.

FIG. 3 is a flowchart illustrating a process 300 for transmitting messages to UE 101 and UE 102, the method is performed by NN 105.

Process 300 includes step s302 in which NN 105 obtains i) first channel gain information indicating the gain of a first channel between the NN and UE 101 (or "the first UE") and ii) second channel gain information indicating the gain of a second channel between the NN and UE 102 (or "the second UE"). In some embodiments, the NN obtains the first channel gain information using a channel estimation method to estimate the gain of the first channel between the NN and the first UE.

In step s304, NN 105 obtains (e.g., determines or receives): i) first buffer size information for UE 101 (e.g., $q_1$, the number of bits waiting to be sent to UE 101) and ii) second buffer size information for UE 102 (e.g., $q_2$). For example, in some embodiments, obtaining the first buffer size information comprises the NN determining an amount of data stored in a particular buffer for the first UE.

In steps s306, NN 105 uses the obtained channel gain information and buffer size information to determine a first number of sub-codewords, n1, for use in transmitting a first message for UE 101 and a second number of sub-codewords, n2, for use in transmitting a second message for UE 102.

In step s308, NN 105 transmits a superimposed signal comprising the first message for UE 101 and the second message for UE 102, wherein the number of sub-codewords used to transmit the first message is equal n1, and the number of sub-codewords used to transmit the second message is equal n2. In some scenarios, n1>n2, in other scenarios n1=n2 or n2>n1.

In some embodiments, for each sub-codeword used to transmit the first message, NN 105 chooses a power allocation for the sub-codeword, and for each sub-codeword used to transmit the second message, NN 105 chooses a power allocation for the sub-codeword.

In some embodiments, n1, n2, the power allocation for the sub-codewords used to transmit the first message, and the power allocation for the sub-codewords used to transmit the second message are chosen such that Q1≥q1 and Q2≥q2, where Q1 is a maximum number of information bits that can be transmitted to the first UE, q1 is the number of information bits stored in the particular buffer for the first UE, Q2 is a maximum number of information bits that can be transmitted to the second UE, q2 is the number of information bits stored in the particular buffer for the second UE. For example, as described above, NN determines whether equation (5) has a feasible solution.

In some scenarios, the power allocation chosen for a certain sub-codeword that is used to transmit the first message is different than the power allocation chosen for a certain sub-codeword that is used to transmit the second message, and the certain sub-codeword that is used to transmit the first message is transmitted simultaneously with the certain sub-codeword that is used to transmit the second message.

Figure 4:
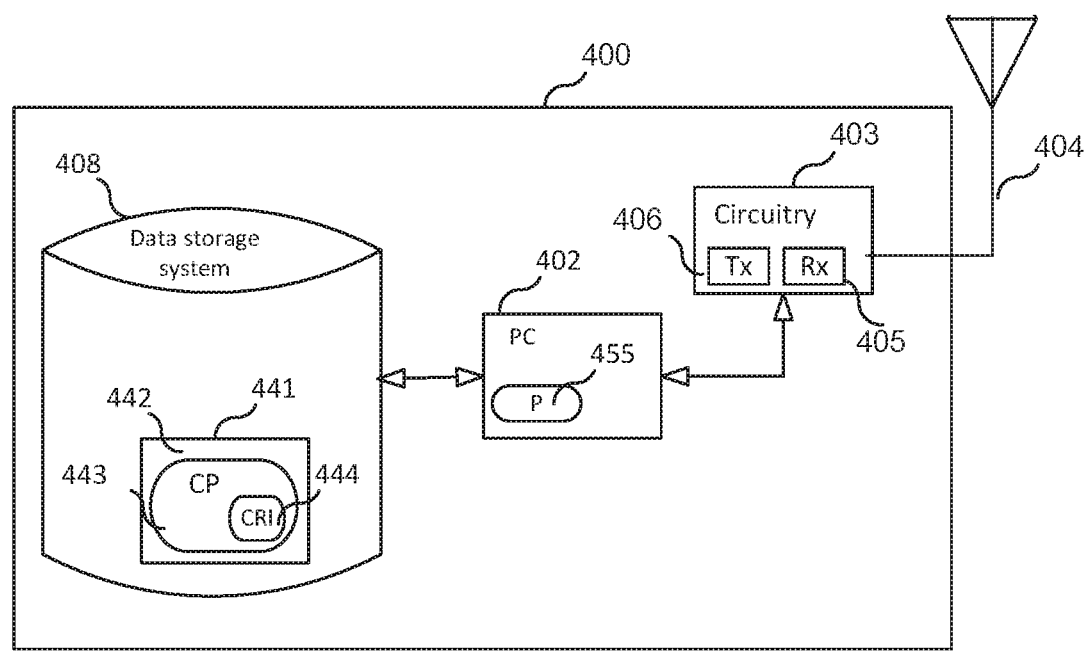
FIG. 4 is a block diagram of an apparatus according to one embodiment.

FIG. 4 is a block diagram of an apparatus 400, according to some embodiments for performing methods disclosed herein. That is, apparatus 400 can be used to implement NN 105. As shown in FIG. 4, apparatus 400 may comprise: processing circuitry (PC) 402, which may include one or more processors (P) 455 (e.g., a general purpose microprocessor and/or one or more other processors, such as an application specific integrated circuit (ASIC), field-programmable gate arrays (FPGAs), and the like), which processors may be co-located or distributed in different locations; circuitry 403 (e.g., radio transceiver circuitry comprising an Rx 405 and a Tx 406) coupled to an antenna system 404 for wireless communication); and a local storage unit (a.k.a., "data storage system") 408, which may include one or more non-volatile storage devices and/or one or more volatile storage devices. In embodiments where PC 402 includes a programmable processor, a computer program product (CPP) 441 may be provided. CPP 441 includes a computer readable medium (CRM) 442 storing a computer program (CP) 443 comprising computer readable instructions (CRI) 444. CRM 442 may be a non-transitory computer readable medium, such as, magnetic media (e.g., a hard disk), optical media, memory devices (e.g., random access memory, flash memory), and the like. In some embodiments, the CRI 444 of computer program 443 is configured such that when executed by PC 402, the CRI causes apparatus 400 to perform steps described herein (e.g., steps described herein with reference to the flow charts). In other embodiments, apparatus 400 may be configured to perform steps described herein without the need for code. That is, for example, PC 402 may consist merely of one or more ASICs. Hence, the features of the embodiments described herein may be implemented in hardware and/or software.

Figure 5:
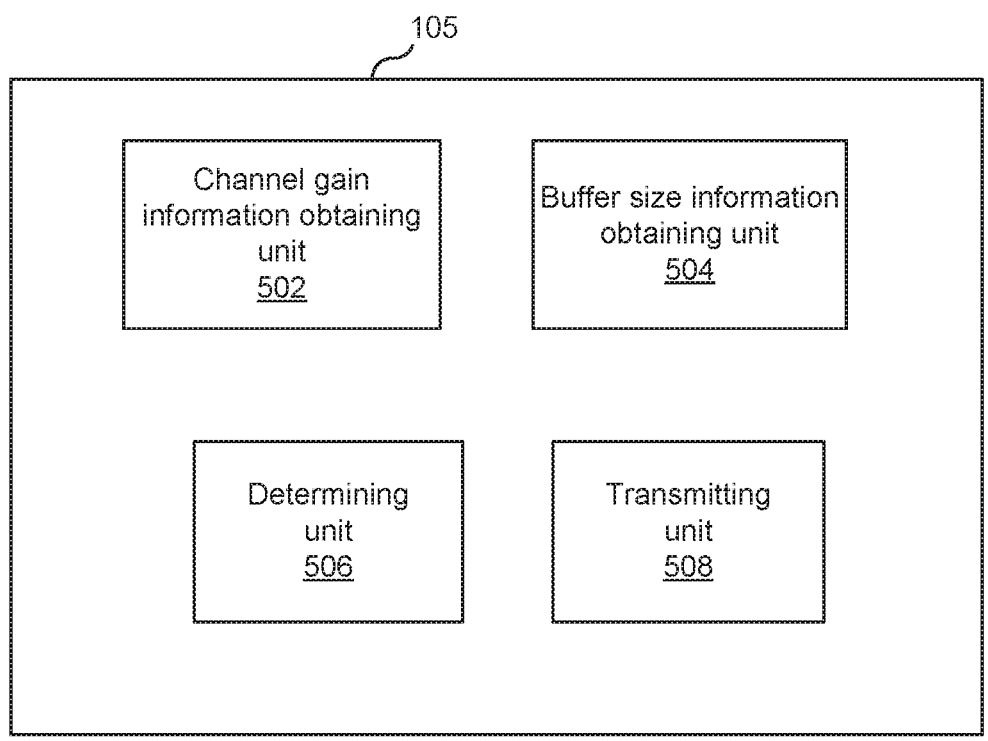
FIG. 5 is a diagram showing functional units of a network node according to an embodiment.

FIG. 5 is a diagram showing functional units of network node 105 according to an embodiment. In the embodiment shown, network node 105 includes: a channel gain information obtaining unit 502 for obtaining: i) first channel gain information indicating the gain of a first channel between the NN and a first UE and ii) second channel gain information indicating the gain of a second channel between the NN and a second UE; a buffer size information obtaining unit 504 for obtaining: i) first buffer size information for the first UE and ii) second buffer size information for the second UE; a determining unit 506 for using the obtained channel gain information and buffer size information to determine: i) a first number of sub-codewords, $n_1$, for use in transmitting a first message for the first UE and ii) a second number of sub-codewords, $n_2$, for use in transmitting a second message for the second UE; and a transmitting unit 508 for employing a transmitter (e.g., Tx 406) to transmit a superimposed signal comprising the first message for the first UE and the second message for the second UE, wherein the number of sub-codewords used to transmit the first message is equal $n_1$ and the number of sub-codewords used to transmit the second message is equal $n_2$.

Figure 6:
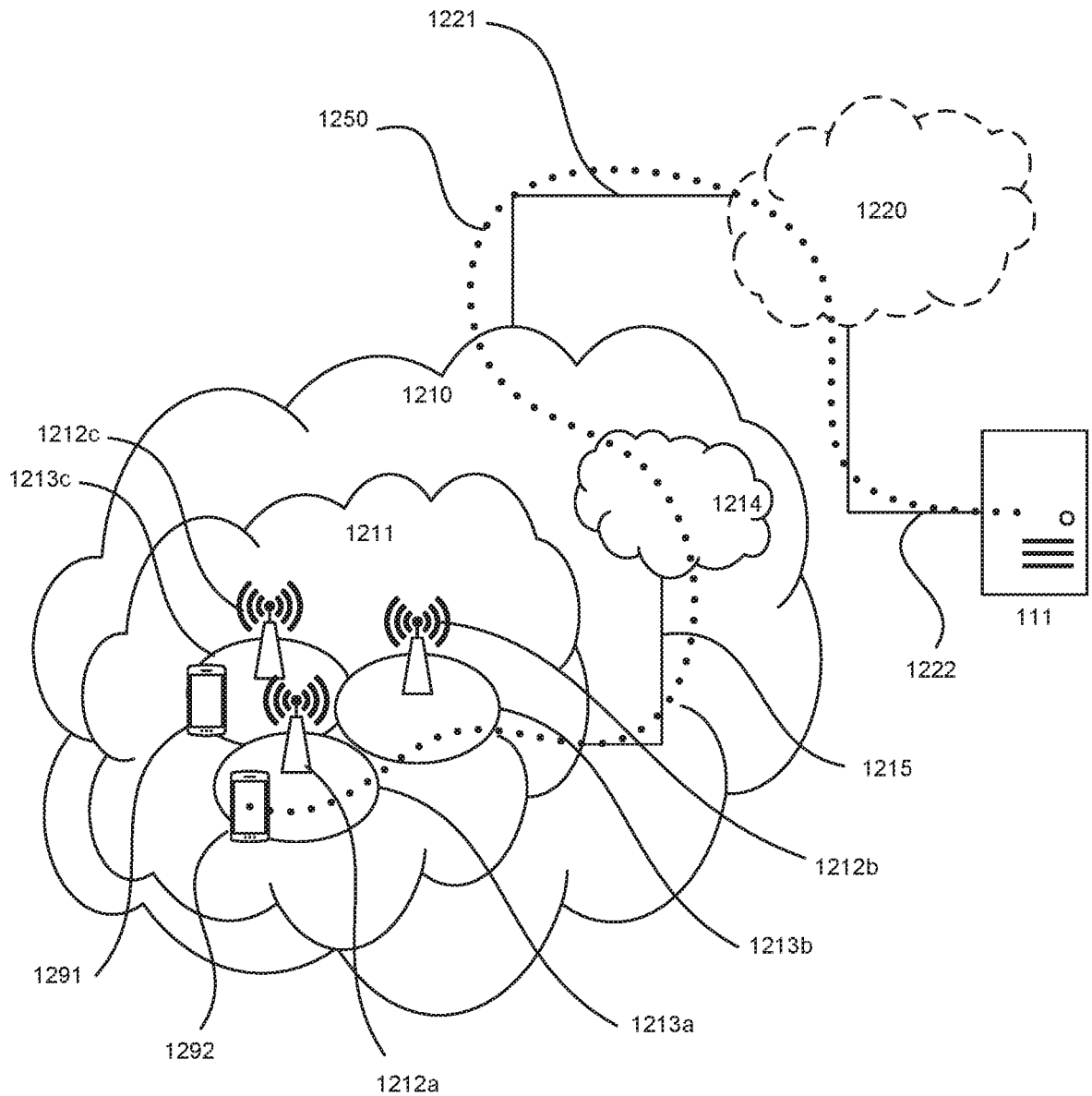
FIG. 6 schematically illustrates a telecommunication network connected via an intermediate network to a host computer.

FIG. 6 illustrates a telecommunication network connected via an intermediate network to host computer 111 in accordance with some embodiments. With reference to FIG. 6, in accordance with an embodiment, a communication system includes telecommunication network 1210, such as a 3GPP-type cellular network, which comprises access network 1211, such as a radio access network, and core network 1214. Access network 1211 comprises a plurality of APs (hereafter base stations) 1212a, 1212b, 1212c, such as NBs, eNBs, gNBs or other types of wireless access points, each defining a corresponding coverage area 1213a, 1213b, 1213c. Each base station 1212a, 1212b, 1212c is connectable to core network 1214 over a wired or wireless connection 1215. A first UE 1291 located in coverage area 1213c is configured to wirelessly connect to, or be paged by, the corresponding base station 1212c. A second UE 1292 in coverage area 1213a is wirelessly connectable to the corresponding base station 1212a. While a plurality of UEs 1291, 1292 are illustrated in this example, the disclosed embodiments are equally applicable to a situation where a sole UE is in the coverage area or where a sole UE is connecting to the corresponding base station 1212.

Telecommunication network 1210 is itself connected to host computer 111, which may be embodied in the hardware and/or software of a standalone server, a cloud-implemented server, a distributed server or as processing resources in a server farm. Host computer 111 may be under the ownership or control of a service provider, or may be operated by the service provider or on behalf of the service provider. Connections 1221 and 1222 between telecommunication network 1210 and host computer 111 may extend directly from core network 1214 to host computer 111 or may go via an optional intermediate network 1220. Intermediate network 1220 may be one of, or a combination of more than one of, a public, private or hosted network; intermediate network 1220, if any, may be a backbone network or the Internet; in particular, intermediate network 1220 may comprise two or more sub-networks (not shown).

The communication system of FIG. 6 as a whole enables connectivity between the connected UEs 1291, 1292 and host computer 111. The connectivity may be described as an over-the-top (OTT) connection 1250. Host computer 111 and the connected UEs 1291, 1292 are configured to communicate data and/or signaling via OTT connection 1250, using access network 1211, core network 1214, any intermediate network 1220 and possible further infrastructure (not shown) as intermediaries. OTT connection 1250 may be transparent in the sense that the participating communication devices through which OTT connection 1250 passes are unaware of routing of uplink and downlink communications. For example, base station 1212 may not or need not be informed about the past routing of an incoming downlink communication with data originating from host computer 111 to be forwarded (e.g., handed over) to a connected UE 1291. Similarly, base station 1212 need not be aware of the future routing of an outgoing uplink communication originating from the UE 1291 towards the host computer 111.

Example implementations, in accordance with an embodiment, of the UE, base station and host computer discussed in the preceding paragraphs will now be described with reference to FIG. 7, which illustrates a host computer communicating via a base station with a user equipment over a partially wireless connection in accordance with some embodiments. In communication system 1300, host computer 1310 comprises hardware 1315 including communication interface 1316 configured to set up and maintain a wired or wireless connection with an interface of a different communication device of communication system 1300. Host computer 1310 further comprises processing circuitry 1318, which may have storage and/or processing capabilities. In particular, processing circuitry 1318 may comprise one or more programmable processors, application-specific integrated circuits, field programmable gate arrays or combinations of these (not shown) adapted to execute instructions. Host computer 1310 further comprises software 1311, which is stored in or accessible by host computer 1310 and executable by processing circuitry 1318. Software 1311 includes host application 1312. Host application 1312 may be operable to provide a service to a remote user, such as UE 1330 connecting via OTT connection 1350 terminating at UE 1330 and host computer 1310. In providing the service to the remote user, host application 1312 may provide user data which is transmitted using OTT connection 1350.

Communication system 1300 further includes base station 1320 provided in a telecommunication system and comprising hardware 1325 enabling it to communicate with host computer 1310 and with UE 1330. Hardware 1325 may include communication interface 1326 for setting up and maintaining a wired or wireless connection with an interface of a different communication device of communication system 1300, as well as radio interface 1327 for setting up and maintaining at least wireless connection 1370 with UE 1330 located in a coverage area (not shown in FIG. 7) served by base station 1320. Communication interface 1326 may be configured to facilitate connection 1360 to host computer 1310. Connection 1360 may be direct or it may pass through a core network (not shown in FIG. 7) of the telecommunication system and/or through one or more intermediate networks outside the telecommunication system. In the embodiment shown, hardware 1325 of base station 1320 further includes processing circuitry 1328, which may comprise one or more programmable processors, application-specific integrated circuits, field programmable gate arrays or combinations of these (not shown) adapted to execute instructions. Base station 1320 further has software 1321 stored internally or accessible via an external connection.

Communication system 1300 further includes UE 1330 already referred to. Its hardware 1335 may include radio interface 1337 configured to set up and maintain wireless connection 1370 with a base station serving a coverage area in which UE 1330 is currently located. Hardware 1335 of UE 1330 further includes processing circuitry 1338, which may comprise one or more programmable processors, application-specific integrated circuits, field programmable gate arrays or combinations of these (not shown) adapted to execute instructions. UE 1330 further comprises software 1331, which is stored in or accessible by UE 1330 and executable by processing circuitry 1338. Software 1331 includes client application 1332. Client application 1332 may be operable to provide a service to a human or non-human user via UE 1330, with the support of host computer 1310. In host computer 1310, an executing host application 1312 may communicate with the executing client application 1332 via OTT connection 1350 terminating at UE 1330 and host computer 1310. In providing the service to the user, client application 1332 may receive request data from host application 1312 and provide user data in response to the request data. OTT connection 1350 may transfer both the request data and the user data. Client application 1332 may interact with the user to generate the user data that it provides.

Figure 7:
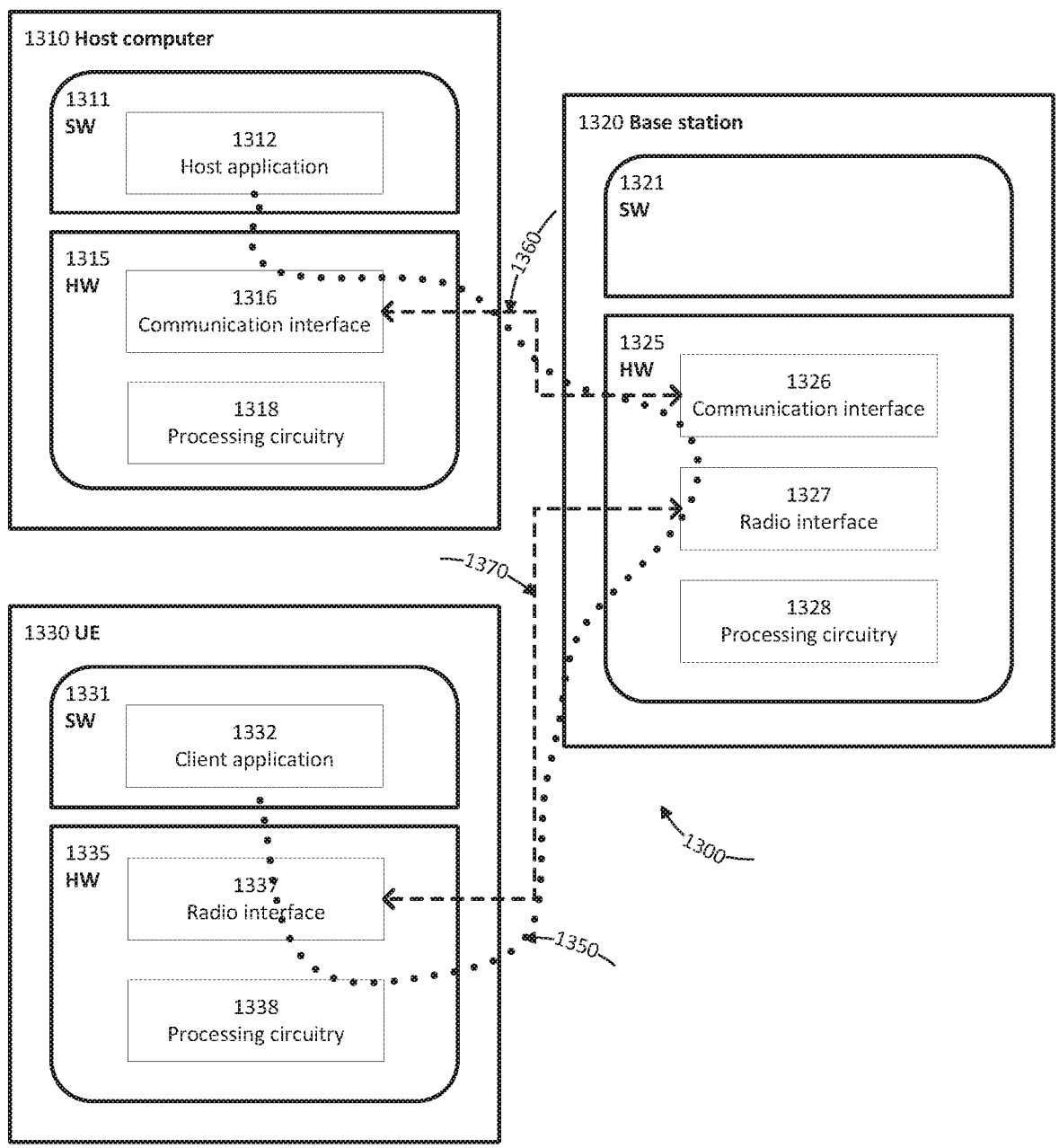
FIG. 7 is a generalized block diagram of a host computer communicating via a base station with a user equipment over a partially wireless connection.

It is noted that host computer 1310, base station 1320 and UE 1330 illustrated in FIG. 7 may be similar or identical to host computer 111, one of base stations 1212*a*, 1212*b*, 1212*c* and one of UEs 1291, 1292 of FIG. 6, respectively. This is to say, the inner workings of these entities may be as shown in FIG. 7 and independently, the surrounding network topology may be that of FIG. 6.

In FIG. 7, OTT connection 1350 has been drawn abstractly to illustrate the communication between host computer 1310 and UE 1330 via base station 1320, without explicit reference to any intermediary devices and the precise routing of messages via these devices. Network infrastructure may determine the routing, which it may be configured to hide from UE 1330 or from the service provider operating host computer 1310, or both. While OTT connection 1350 is active, the network infrastructure may further take decisions by which it dynamically changes the routing (e.g., on the basis of load balancing consideration or reconfiguration of the network).

Wireless connection 1370 between UE 1330 and base station 1320 is in accordance with the teachings of the embodiments described throughout this disclosure. One or more of the various embodiments improve the performance of OTT services provided to UE 1330 using OTT connection 1350, in which wireless connection 1370 forms the last segment. More precisely, the teachings of these embodiments may improve one or more of message network throughput, SINR, latency, overhead, energy efficiency, and power consumption and thereby provide benefits such as reduced user waiting time, better responsiveness, extended battery lifetime, etc.

A measurement procedure may be provided for the purpose of monitoring data rate, latency and other factors on which the one or more embodiments improve. There may further be an optional network functionality for reconfiguring OTT connection 1350 between host computer 1310 and UE 1330, in response to variations in the measurement results. The measurement procedure and/or the network functionality for reconfiguring OTT connection 1350 may be implemented in software 1311 and hardware 1315 of host computer 1310 or in software 1331 and hardware 1335 of UE 1330, or both. In embodiments, sensors (not shown) may be deployed in or in association with communication devices through which OTT connection 1350 passes; the sensors may participate in the measurement procedure by supplying values of the monitored quantities exemplified above, or supplying values of other physical quantities from which software 1311, 1331 may compute or estimate the monitored quantities. The reconfiguring of OTT connection 1350 may include message format, retransmission settings, preferred routing etc.; the reconfiguring need not affect base station 1320, and it may be unknown or imperceptible to base station 1320. Such procedures and functionalities may be known and practiced in the art. In certain embodiments, measurements may involve proprietary UE signaling facilitating host computer 1310's measurements of throughput, propagation times, latency and the like. The measurements may be implemented in that software 1311 and 1331 causes messages to be transmitted, in particular empty or 'dummy' messages, using OTT connection 1350 while it monitors propagation times, errors etc.

Figure 8:
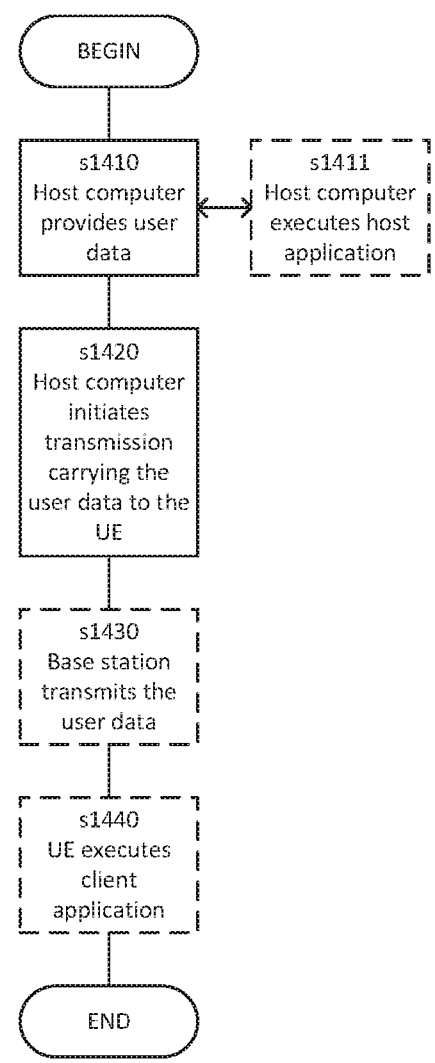
FIG. 8 is a flowchart illustrating a method implemented in a communication system including a host computer, a base station and a user equipment.

FIG. 8 is a flowchart illustrating a method implemented in a communication system, in accordance with one embodiment. The communication system includes a host computer, a base station and a UE which may be those described with reference to FIG. 6 and FIG. 7. In step S1410, the host computer provides user data. In substep S1411 (which may be optional) of step S1410, the host computer provides the user data by executing a host application. In step S1420, the host computer initiates a transmission carrying the user data to the UE. In step S1430 (which may be optional), the base station transmits to the UE the user data which was carried in the transmission that the host computer initiated, in accordance with the teachings of the embodiments described throughout this disclosure. In step S1440 (which may also be optional), the UE executes a client application associated with the host application executed by the host computer.

Figure 9:
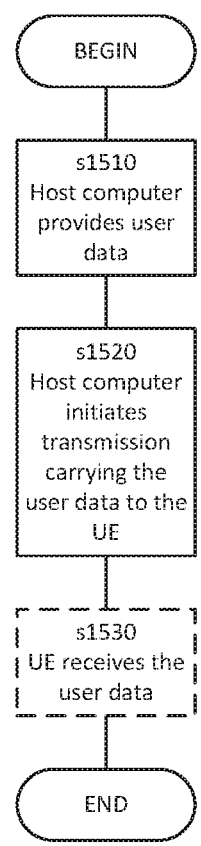
FIG. 9 is a flowchart illustrating a method implemented in a communication system including a host computer, a base station and a user equipment.

FIG. 9 is a flowchart illustrating a method implemented in a communication system, in accordance with one embodiment. The communication system includes a host computer, a base station and a UE which may be those described with reference to FIG. 6 and FIG. 7. For simplicity of the present disclosure, only drawing references to FIG. 9 will be included in this section. In step S1510 of the method, the host computer provides user data. In an optional substep (not shown) the host computer provides the user data by executing a host application. In step S1520, the host computer initiates a transmission carrying the user data to the UE. The transmission may pass via the base station, in accordance with the teachings of the embodiments described throughout this disclosure. In step S1530 (which may be optional), the UE receives the user data carried in the transmission.

Figure 10:
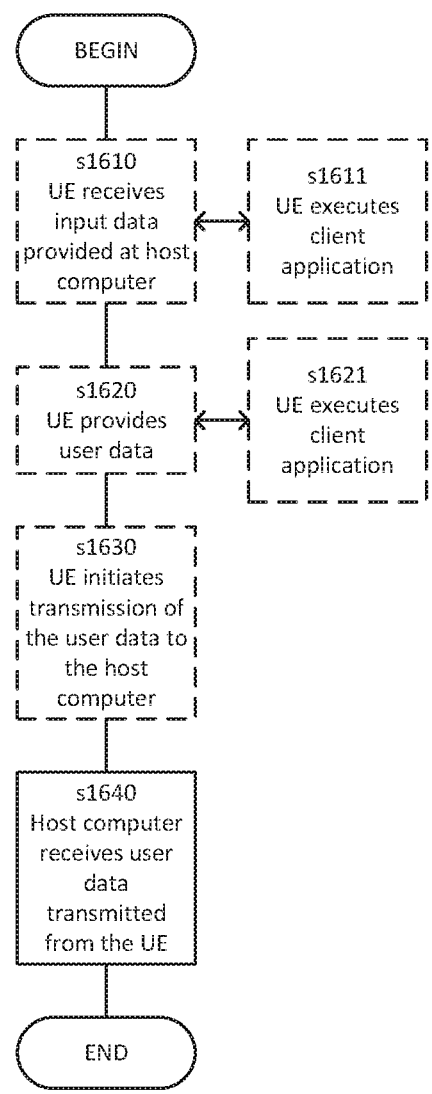
FIG. 10 is a flowchart illustrating a method implemented in a communication system including a host computer, a base station and a user equipment.

FIG. 10 is a flowchart illustrating a method implemented in a communication system, in accordance with one embodiment. The communication system includes a host computer, a base station and a UE which may be those described with reference to FIG. 6 and FIG. 7. For simplicity of the present disclosure, only drawing references to FIG. 10 will be included in this section. In step S1610 (which may be optional), the UE receives input data provided by the host computer. Additionally or alternatively, in step S1620, the UE provides user data. In substep S1621 (which may be optional) of step S1620, the UE provides the user data by executing a client application. In substep S1611 (which may be optional) of step S1610, the UE executes a client application which provides the user data in reaction to the received input data provided by the host computer. In providing the user data, the executed client application may further consider user input received from the user. Regardless of the specific manner in which the user data was provided, the UE initiates, in substep 51630 (which may be optional), transmission of the user data to the host computer. In step S1640 of the method, the host computer receives the user data transmitted from the UE, in accordance with the teachings of the embodiments described throughout this disclosure.

Figure 11:
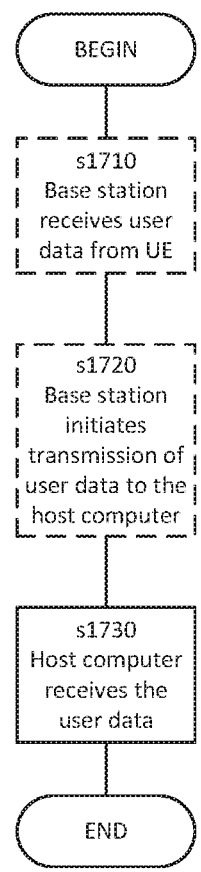
FIG. 11 is a flowchart illustrating a method implemented in a communication system including a host computer, a base station and a user equipment.

FIG. 11 is a flowchart illustrating a method implemented in a communication system, in accordance with one embodiment. The communication system includes a host computer, a base station and a UE which may be those described with reference to FIG. 6 and FIG. 7. For simplicity of the present disclosure, only drawing references to FIG. 11 will be included in this section. In step S1710 (which may be optional), in accordance with the teachings of the embodiments described throughout this disclosure, the base station receives user data from the UE. In step S1720 (which may be optional), the base station initiates transmission of the received user data to the host computer. In step S1730 (which may be optional), the host computer receives the user data carried in the transmission initiated by the base station.

Any appropriate steps, methods, features, functions, or benefits disclosed herein may be performed through one or more functional units or modules of one or more virtual apparatuses. Each virtual apparatus may comprise a number of these functional units. These functional units may be implemented via processing circuitry, which may include one or more microprocessor or microcontrollers, as well as other digital hardware, which may include digital signal processors (DSPs), special-purpose digital logic, and the like. The processing circuitry may be configured to execute program code stored in memory, which may include one or several types of memory such as read-only memory (ROM), random-access memory (RAM), cache memory, flash memory devices, optical storage devices, etc. Program code stored in memory includes program instructions for executing one or more telecommunications and/or data communications protocols as well as instructions for carrying out one or more of the techniques described herein. In some implementations, the processing circuitry may be used to cause the respective functional unit to perform corresponding functions according one or more embodiments of the present disclosure.

While various embodiments are described herein, it should be understood that they have been presented by way of example only, and not limitation. Thus, the breadth and scope of this disclosure should not be limited by any of the above-described exemplary embodiments. Moreover, any combination of the above-described elements in all possible variations thereof is encompassed by the disclosure unless otherwise indicated herein or otherwise clearly contradicted by context.

Additionally, while the processes described above and illustrated in the drawings are shown as a sequence of steps, this was done solely for the sake of illustration. Accordingly, it is contemplated that some steps may be added, some steps may be omitted, the order of the steps may be re-arranged, and some steps may be performed in parallel.

The invention claimed is:

1. A method for transmitting messages, the method being performed by a network node (NN) and comprising:
   the NN obtaining first channel gain information indicating the gain of a first channel between the NN and a first user equipment (UE);
   the NN obtaining second channel gain information indicating the gain of a second channel between the NN and a second UE;
   the NN obtaining first buffer size information for the first UE;
   the NN obtaining second buffer size information for the second UE;
   the NN using the obtained channel gain information and buffer size information to determine a first number of sub-codewords, n1, for use in transmitting a first message for the first UE and a second number of sub-codewords, n2, for use in transmitting a second message for the second UE; and
   transmitting a superimposed signal comprising the first message for the first UE and the second message for the second UE, wherein
   the number of sub-codewords used to transmit the first message is equal n1, and
   the number of sub-codewords used to transmit the second message is equal n2.

2. The method of claim 1, wherein obtaining the first channel gain information comprises the NN using a channel estimation method to estimate the gain of the first channel between the NN and the first UE.

3. The method of claim 1, wherein obtaining the first buffer size information comprises the NN determining an amount of data stored in a particular buffer for the first UE.

4. The method of claim 3, further comprising
   for each sub-codeword used to transmit the first message, choosing a power allocation for the sub-codeword; and
   for each sub-codeword used to transmit the second message, choosing a power allocation for the sub-codeword.

5. The method of claim 4, wherein n1, n2, the power allocation for the sub-codewords used to transmit the first message, and the power allocation for the sub-codewords used to transmit the second message are chosen such that $Q1 \geq q1$ and $Q2 \geq q2$, where Q1 is a maximum number of information bits that can be transmitted to the first UE, q1 is the number of information bits stored in the particular buffer for the first UE, Q2 is a maximum number of information bits that can be transmitted to the second UE, q2 is the number of information bits stored in the particular buffer for the second UE.

6. The method of claim 4, wherein
   the power allocation chosen for a certain sub-codeword that is used to transmit the first message is different than the power allocation chosen for a certain sub-codeword that is used to transmit the second message, and
   the certain sub-codeword that is used to transmit the first message is transmitted simultaneously with the certain sub-codeword that is used to transmit the second message.

7. The method of claim 1, wherein the NN is a base station.

8. The method of claim 1, wherein n1>n2 or n2>n1.

9. A network node (NN) for transmitting messages, the NN being adapted to:
   obtain first channel gain information indicating the gain of a first channel between the NN and a first UE;
   obtain second channel gain information indicating the gain of a second channel between the NN and a second UE;

obtain first buffer size information for the first UE;
obtain second buffer size information for the second UE;
use the obtained channel gain information and buffer size information to determine a first number of sub-codewords, n1, for use in transmitting a first message for the first UE and a second number of sub-codewords, n2, for use in transmitting a second message for the second UE; and
transmit a superimposed signal comprising the first message for the first UE and the second message for the second UE, wherein
the number of sub-codewords used to transmit the first message is equal n1, and
the number of sub-codewords used to transmit the second message is equal n2.

10. The NN of claim 9, wherein n1>n2 or n2>n1.

11. The NN of claim 9, wherein obtaining the first channel gain information comprises the NN using a channel estimation method to estimate the gain of the first channel between the NN and the first UE.

12. The NN of claim 9, wherein obtaining the first buffer size information comprises the NN determining an amount of data stored in a particular buffer for the first UE.

13. The NN of claim 12, further comprising
for each sub-codeword used to transmit the first message, choosing a power allocation for the sub-codeword; and
for each sub-codeword used to transmit the second message, choosing a power allocation for the sub-codeword.

14. The NN of claim 13, wherein n1, n2, the power allocation for the sub-codewords used to transmit the first message, and the power allocation for the sub-codewords used to transmit the second message are chosen such that $Q1 \geq q1$ and $Q2 \geq q2$, where $Q1$ is a maximum number of information bits that can be transmitted to the first UE, $q1$ is the number of information bits stored in the particular buffer for the first UE, $Q2$ is a maximum number of information bits that can be transmitted to the second UE, $q2$ is the number of information bits stored in the particular buffer for the second UE.

15. The NN of claim 13, wherein
the power allocation chosen for a certain sub-codeword that is used to transmit the first message is different than the power allocation chosen for a certain sub-codeword that is used to transmit the second message, and
the certain sub-codeword that is used to transmit the first message is transmitted simultaneously with the certain sub-codeword that is used to transmit the second message.

16. The NN of claim 9, wherein the NN is a base station.

17. A computer program product comprising a non-transitory computer readable medium storing a computer program comprising instructions which when executed by processing circuitry of a network node causes the network node to perform the method of claim 1.

18. The method of claim 1, further comprising, for each sub-codeword used to transmit the first message, determining a power allocation for the sub-codeword.

19. The method of claim 18, wherein determining the power allocation for the sub-codeword comprises determining the power allocation for the sub-codeword using the first buffer size information.

* * * * *